(12) United States Patent
Yang et al.

(10) Patent No.: US 11,996,780 B2
(45) Date of Patent: May 28, 2024

(54) POWER CONVERSION CIRCUIT

(71) Applicant: Delta Electronics, Inc., Taoyuan (TW)

(72) Inventors: Zhongwang Yang, Taoyuan (TW); Qi Xia, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 232 days.

(21) Appl. No.: 17/752,587

(22) Filed: May 24, 2022

(65) Prior Publication Data
US 2023/0006560 A1 Jan. 5, 2023

(30) Foreign Application Priority Data
Jul. 2, 2021 (CN) .......................... 202110748442.4

(51) Int. Cl.
H02M 3/335 (2006.01)
H02M 1/00 (2006.01)
H02M 3/00 (2006.01)

(52) U.S. Cl.
CPC ..... *H02M 3/33569* (2013.01); *H02M 1/0058* (2021.05); *H02M 3/01* (2021.05)

(58) Field of Classification Search
CPC ... H02M 3/01; H02M 3/33569; H02M 1/0058
See application file for complete search history.

(56) References Cited

U.S. PATENT DOCUMENTS

| 6,069,803 | A  | * | 5/2000  | Cross | H02M 3/01 |
| | | | | | 363/56.11 |
| 10,461,653 | B1 | * | 10/2019 | Wong  | H02M 3/33507 |
| 2018/0062529 | A1 | * | 3/2018  | Song  | H02M 3/33569 |
| 2020/0403521 | A1 | * | 12/2020 | Zheng | H02M 3/33592 |

FOREIGN PATENT DOCUMENTS

| CN | 102891608 B | 3/2016 |
| KR | 100721432 B1 | 5/2007 |

* cited by examiner

Primary Examiner — Jue Zhang
(74) Attorney, Agent, or Firm — KIRTON McCONKIE; Evan R. Witt

(57) ABSTRACT

The present disclosure provides a power conversion circuit including positive and negative input terminals, a clamping branch circuit, a first primary switch, a transformer, a rectifier circuit, a resonant inductor, a resonant capacitor, and positive and negative output terminals. The clamping branch circuit includes a clamping capacitor and a second primary switch serially connected between the first and second terminals thereof. The first terminal is coupled to the positive input terminal. The first primary switch is connected between the second terminal and the negative input terminal. The primary winding of the transformer is connected to the clamping branch circuit in parallel. The rectifier circuit includes first and second bridge arms connected in parallel. Connection terminals in the first and second bridge arms are coupled to two terminals of the secondary winding of the transformer correspondingly. The first and second bridge arms are coupled between the positive and negative output terminals.

15 Claims, 16 Drawing Sheets

POWER CONVERSION CIRCUIT

CROSS-REFERENCE TO RELATED APPLICATION

This application claims priority to China Patent Application No. 202110748442.4, filed on Jul. 2, 2021, the entire contents of which are incorporated herein by reference for all purposes.

FIELD OF THE INVENTION

The present disclosure relates to the field of power electronics technology, and more particularly to a power conversion circuit.

BACKGROUND OF THE INVENTION

With the rapid development of the railway transportation industry, the demand for high-power DC/DC modular power supply is increasing. In order to meet various application requirements with different bus voltages, the range of the input voltage of the modular power supply is getting wider and wider, and the output current of the modular power supply is also increasing. Therefore, the demand for the DC/DC modular power supply with high efficiency, high power density and low cost increases.

Conventionally, in the application of the isolated power converter with wide input voltage range, a flyback topology or an active clamp forward topology may be adopted. However, the primary switch in the conventional flyback topology requires high withstand voltage, and the secondary switch in the conventional active clamp forward topology requires high withstand voltage. When the switch with high withstand voltage is adopted to meet the requirement, the on-resistance would be too high, which causes large conduction loss.

In addition, the conventional flyback topology works in the continuous conduction mode (CCM) when the output power increases, and the secondary switch has a reverse recovery loss. Therefore, even if the resonant elements are disposed in the primary circuit, the complete soft switching can't be realized. Further, the primary switch of the conventional active clamp forward topology is unable to realize the complete soft switching. Since the soft switching can't be realized, the overall energy efficiency is low, and more heat energy would be generated, resulting in higher heat dissipation requirements.

Therefore, there is a need of providing a power conversion circuit in order to overcome the drawbacks of the conventional technologies.

SUMMARY OF THE INVENTION

The present disclosure provides a power conversion circuit. All the switches of the power conversion circuit can realize the soft switching, thereby reducing the loss. In addition, the resonant elements are provided in the power conversion circuit. Due to the resonance, the switches with lower withstand voltage can be adopted, thus the on-resistance of the switch decreases, and the loss is further reduced. Therefore, under the wide input voltage range, the power conversion circuit of the present disclosure still has high energy efficiency.

In accordance with an aspect of the present disclosure, a power conversion circuit is provided. The power conversion circuit includes a positive input terminal, a negative input terminal, a clamping branch circuit, a first primary switch, a transformer, a rectifier circuit, a resonant inductor, a resonant capacitor, a positive output terminal, and a negative output terminal. The positive input terminal and the negative input terminal are configured to receive an input voltage. The clamping branch circuit and the first primary switch are electrically connected in series. The clamping branch circuit has a first terminal and a second terminal and includes a clamping capacitor and a second primary switch electrically connected in series between the first terminal and the second terminal. The first terminal is coupled to the positive input terminal. The first primary switch is electrically connected between the second terminal and the negative input terminal. The transformer includes a primary winding and a secondary winding coupled to each other, and the primary winding and the clamping branch circuit are electrically connected in parallel. The rectifier circuit includes a first bridge arm and a second bridge arm electrically connected to each other in parallel. The first bridge arm includes two switch elements electrically connected in series, and the second bridge arm includes two electronic elements electrically connected in series. A first connection terminal between the two switch elements and a second connection terminal between the two electronic elements are coupled to two terminals of the secondary winding correspondingly. The resonant inductor and the resonant capacitor are configured to resonate in the power conversion circuit. The positive output terminal and the negative output terminal are configured to provide an output voltage. The first and second bridge arms electrically connected in parallel are coupled between the positive output terminal and the negative output terminal.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
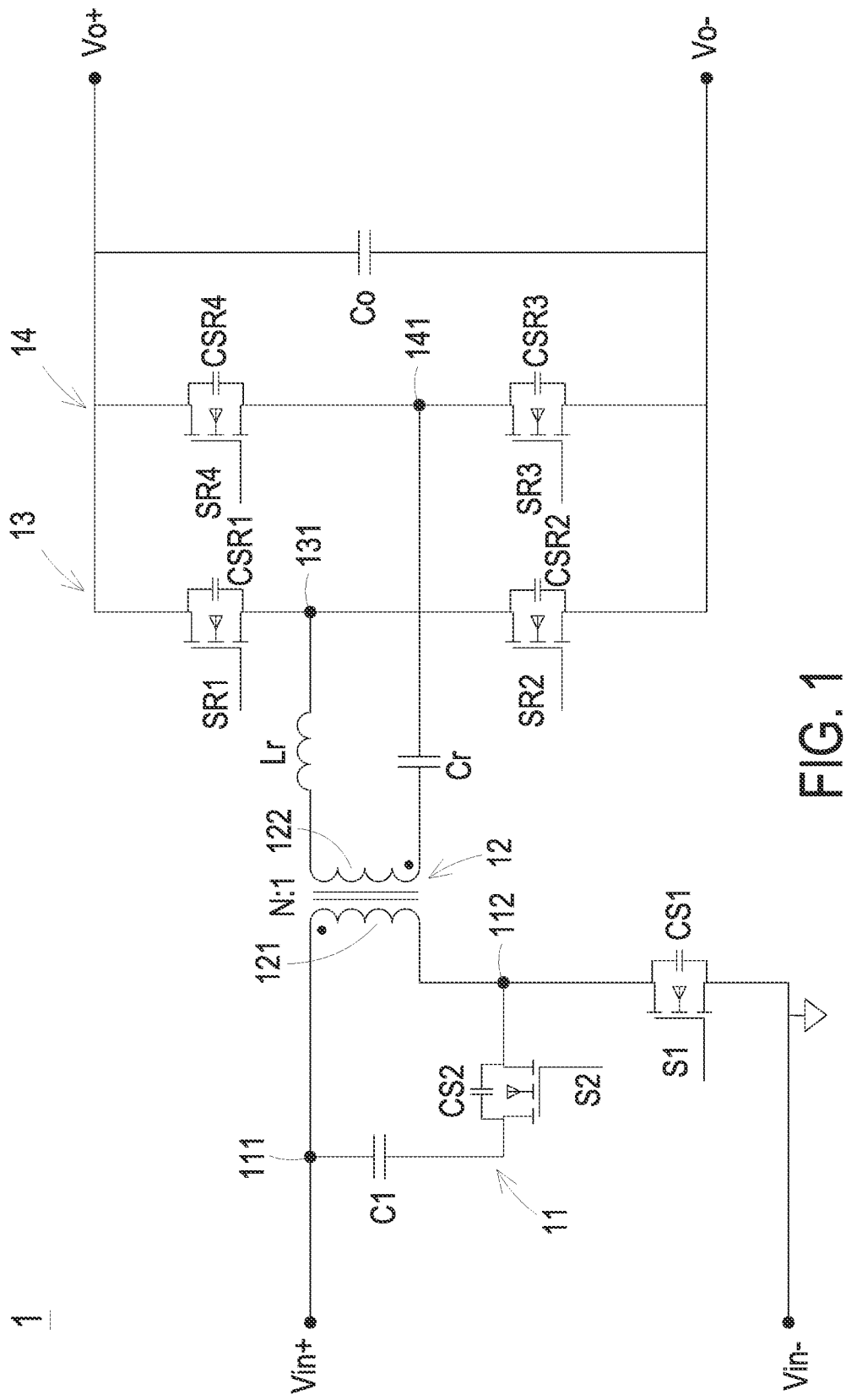
FIG. 1 is a schematic circuit diagram illustrating a power conversion circuit according to a first embodiment of the present disclosure.

FIG. 1 is a schematic circuit diagram illustrating a power conversion circuit according to a first embodiment of the present disclosure. As shown in FIG. 1, the power conversion circuit 1 includes a positive input terminal Vin+, a negative input terminal Vin−, a clamping branch circuit 11, a first primary switch S1, a transformer 12, a rectifier circuit, a resonant inductor Lr, a resonant capacitor Cr, a positive output terminal Vo+, and a negative output terminal Vo−. The positive input terminal Vin+ and the negative input terminal Vin− are configured to receive an input voltage Vin. The clamping branch circuit 11 has a first terminal 111 and a second terminal 112. And the clamping branch circuit 11 includes a clamping capacitor C1 and a second primary switch S2 electrically connected in series between the first terminal 111 and the second terminal 112. The first terminal 111 of the clamping branch circuit 11 is coupled to the positive input terminal Vin+. The first primary switch S1 and the clamping branch circuit 11 is electrically connected in series, and the first primary switch S1 is electrically connected between the second terminal 112 of the clamping branch circuit 11 and the negative input terminal Vin−.

The transformer 12 includes a primary winding 121 and a secondary winding 122 coupled to each other. The primary winding 121 is electrically connected to the clamping branch circuit 11 in parallel. The rectifier circuit includes a first bridge arm 13 and a second bridge arm 14, and the first bridge arm 13 and the second bridge arm 14 are electrically connected in parallel. The two connection terminals of the first bridge arm 13 and the second bridge arm 14 respectively connect to the positive output terminal Vo+ and the negative output terminal Vo−. The first bridge arm 13 includes two switch elements electrically connected in series, and the second bridge arm 14 includes two electronic elements electrically connected in series. The first connection terminal 131 between the two switch elements and the second connection terminal 141 between the two electronic elements are coupled to two terminals of the secondary winding 122 correspondingly. The resonant inductor Lr and the resonant capacitor Cr resonate in the power conversion circuit 1. The positive output terminal Vo+ and the negative output terminal Vo− are configured to provide an output voltage Vo. The first bridge arm 13 and the second bridge arm 14, which are electrically connected in parallel, are coupled between the positive output terminal Vo+ and the negative output terminal Vo−. In an embodiment, the power conversion circuit 1 further includes an output capacitor Co electrically connected to the rectifier circuit in parallel.

In the first embodiment shown in FIG. 1, the two switch elements are a first secondary switch SR1 and a second secondary switch SR2 respectively. The first secondary switch SR1 is electrically connected between the first connection terminal 131 in the first bridge arm 13 and the positive output terminal Vo+. The second secondary switch SR2 is electrically connected between the first connection terminal 131 in the first bridge arm 13 and the negative output terminal Vo−. The two electronic elements are a third secondary switch SR3 and a fourth secondary switch SR4 respectively. The third secondary switch SR3 is electrically connected between the second connection terminal 141 in the second bridge arm 14 and the negative output terminal Vo−. The fourth secondary switch SR4 is electrically connected between the second connection terminal 141 in the second bridge arm 14 and the positive output terminal Vo+. The resonant inductor Lr is coupled between the secondary winding 122 and the first connection terminal 131 in the first bridge arm 13. The resonant capacitor Cr is coupled between the secondary winding 122 and the second connection terminal 141 in the second bridge arm 14. In an embodiment, the resonant inductor Lr and the resonant capacitor Cr can be disposed flexibly at any position on condition that the resonant inductor Lr, the resonant capacitor Cr, and the secondary winding 122 are coupled in series between the first connection terminal 131 in the first bridge arm 13 and the second connection terminal 141 in the second bridge arm 14.

Figure 2:
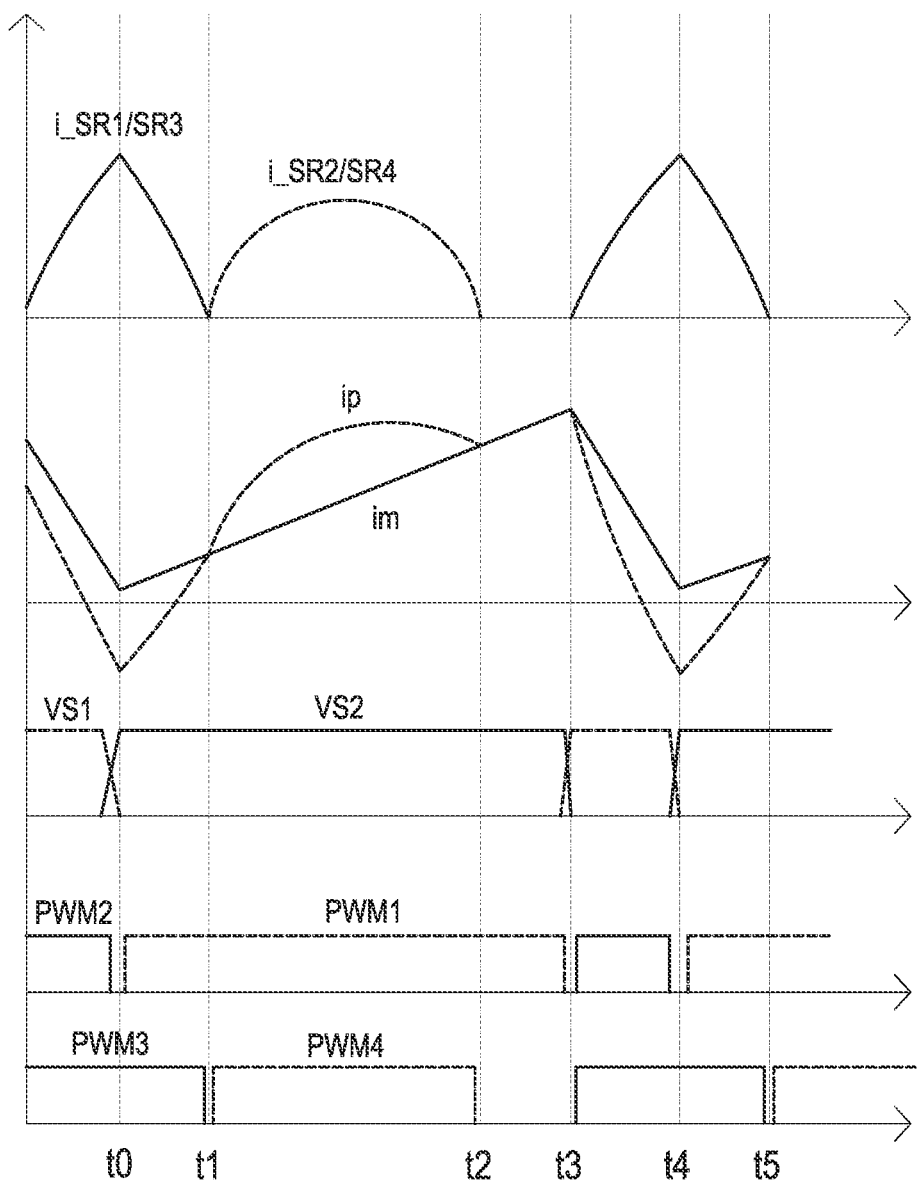
FIG. 2 is a schematic oscillogram of the power conversion circuit of FIG. 1.

Please refer to FIG. 1 and FIG. 2, where FIG. 2 is a schematic oscillogram of the power conversion circuit 1 of FIG. 1. As shown in FIG. 1 and FIG. 2, PWM1 and PWM2 represent the control signals of the first primary switch S1 and the second primary switch S2 respectively. The control signal PWM1 of the first primary switch S1 and the control signal PWM2 of the second primary switch S2 are complementary, and the duty ratio of the control signal PWM1 of the first primary switch S1 depends on the magnitude of the output voltage Vo. In addition, the first secondary switch SR1 and the third secondary switch SR3 are turned on and off synchronously, thus the control signal of the first secondary switch SR1 and the third secondary switch SR3 is represented by PWM3. The second secondary switch SR2 and the fourth secondary switch SR4 are turned on and off synchronously, thus the control signal of the second secondary switch SR2 and the fourth secondary switch SR4 is represented by PWM4. Moreover, the secondary current i_SR1/SR3 represents the current flowing through the first secondary switch SR1 and the third secondary switch SR3, and the secondary current i_SR2/SR4 represents the current flowing through the second secondary switch SR2 and the fourth secondary switch SR4. The duty ratio of the control signal PWM3 depends on the magnitude of the secondary current i_SR1/SR3, and the duty ratio of the control signal PWM4 depends on the magnitude of the secondary current i_SR2/SR4. Each secondary switch is turned on when the current following therethrough changes from zero to a positive value. Each secondary switch is turned off when the current flowing therethrough changes from a positive value to zero. Specifically, when the secondary current i_SR1/SR3 changes from zero to a positive value, the first secondary switch SR1 and the third secondary switch SR3 are turned on; and when the secondary current i_SR2/SR4 changes from zero to a positive value, the second secondary switch SR2 and the fourth secondary switch SR4 are turned on. When the secondary current i_SR1/SR3 changes from a positive value to zero, the first secondary switch SR1 and the third secondary switch SR3 are turned off; and when the secondary current i_SR2/SR4 changes from a positive value to zero, the second secondary switch SR2 and the fourth secondary switch SR4 are turned off. In addition, ip represents the primary current, Lm represents the equivalent magnetizing inductance of the transformer 12 (referring to FIGS. 3A-3D), im represents the magnetizing current flowing through the equivalent magnetizing inductance Lm, and VS1 and VS2 represent the drain-source voltages of the first primary switch S1 and the second primary switch S2 respectively. The primary switches herein are exemplified as MOSFETs, but not limited thereto.

The operation of the power conversion circuit 1 in the first embodiment shown in FIG. 1 would be described in detail as follows according to FIG. 2 and FIGS. 3A-3D. FIG. 3A, FIG. 3B, FIG. 3C, and FIG. 3D schematically show the switching state and current direction of the power conversion circuit 1 in different periods of FIG. 2. In particular, FIG. 3A, FIG. 3B, FIG. 3C, and FIG. 3D are corresponding to the period from time t0 to t1, the period from time t1 to t2, the period from time t2 to t3, and the period from time t3 to t4 respectively. The duration from time t0 to t4 is one cycle. It is noted that the directional terms such as "top", "bottom", "left" and "right" in the following descriptions are based on the perspective of fronting on the figures. Further, the polarity of the voltage across the resonant inductor Lr is defined as being positive on the left and negative on the right, the polarity of the voltage across the resonant capacitor Cr is defined as being negative on the left and positive on the right, and the polarity of the voltage across the secondary winding 122 is defined as being positive on the top and negative on the bottom. The primary current is defined as being positive while flowing into the power conversion circuit 1 through the positive input terminal Vin+ and flowing out from the negative input terminal Vin−.

Before the time t0, the flow direction of the primary current ip is negative, and the primary current ip is generated by the discharge of the junction capacitance CS1 of the first primary switch S1.

Figure 3A:
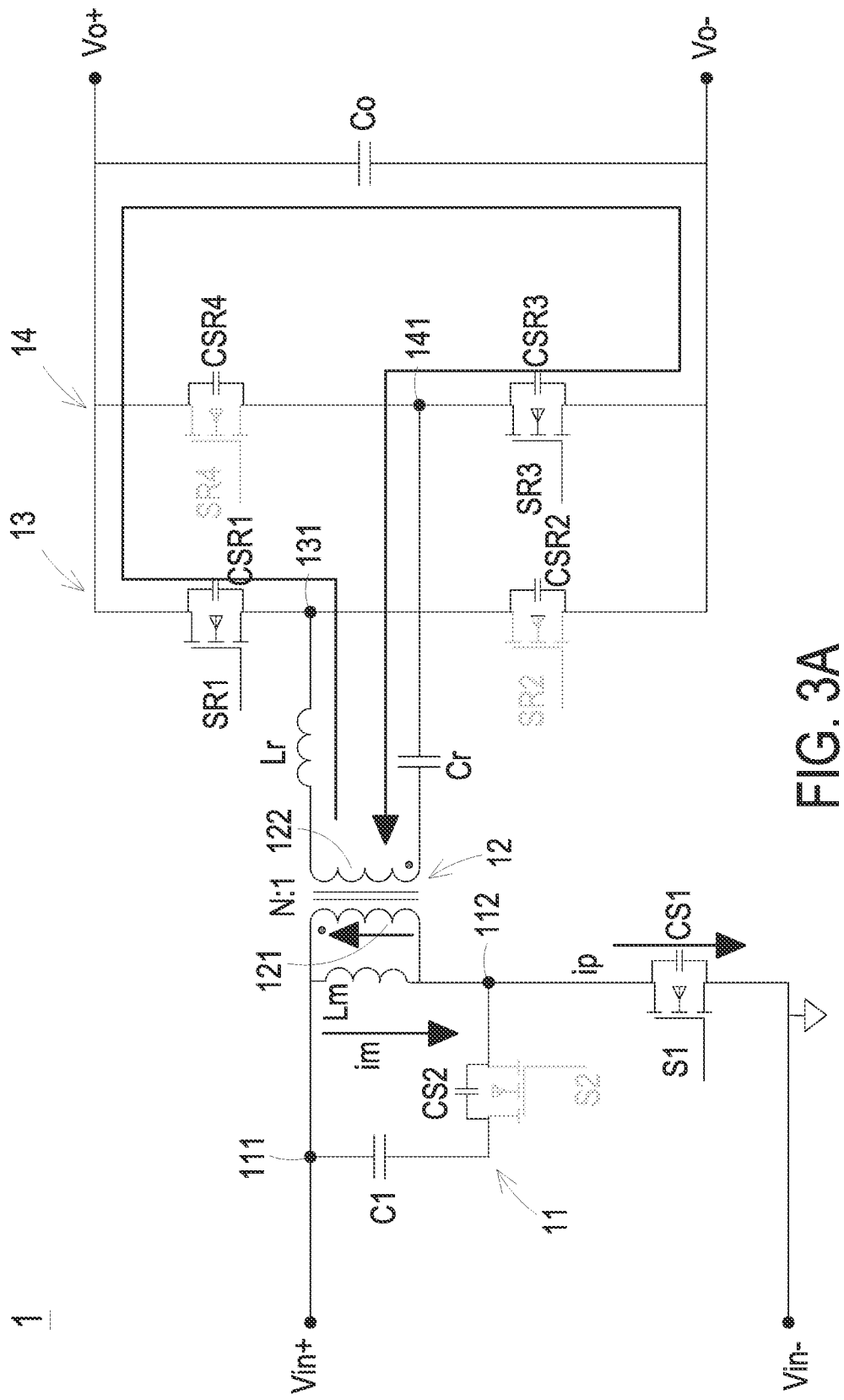
FIG. 3A, FIG. 3B, FIG. 3C, and FIG. 3D schematically show the switching state and current direction of the power conversion circuit of FIG. 1 in different periods of FIG. 2.

As shown in FIG. 2 and FIG. 3A, at the time t0, when the voltage of the junction capacitance CS1 of the first primary switch S1 is discharged to zero, the first primary switch S1 is turned on, and the zero-voltage switching of the first primary switch S1 is realized. In addition, at the time t0, the magnetizing current im is positive (i.e., its flow direction is from top to bottom), and the primary current ip is negative. The first secondary switch SR1 and the third secondary switch SR3 are in the "ON" state. The resonant inductor Lr and the resonant capacitor Cr resonate, and the magnitude of the resonant current is (|ip|+|im|)*N, where N is the turns ratio of the primary winding 121 to the secondary winding 122. The flow direction of the resonant current is shown in FIG. 3A. During the period from time t0 to t1, the resonant inductor Lr and the resonant capacitor Cr resonate, and the primary current ip resonates from a negative value to a positive value.

At the time t0, the voltage VLr(t0) on the resonant inductor Lr is:

$$VLr(t0)=-Vin/N-Vcr(t0)-Vo,$$

where Vcr(t0) represents the voltage across the resonant capacitor Cr at the time t0, and Vo represents the output voltage of the power conversion circuit 1.

Figure 3B:
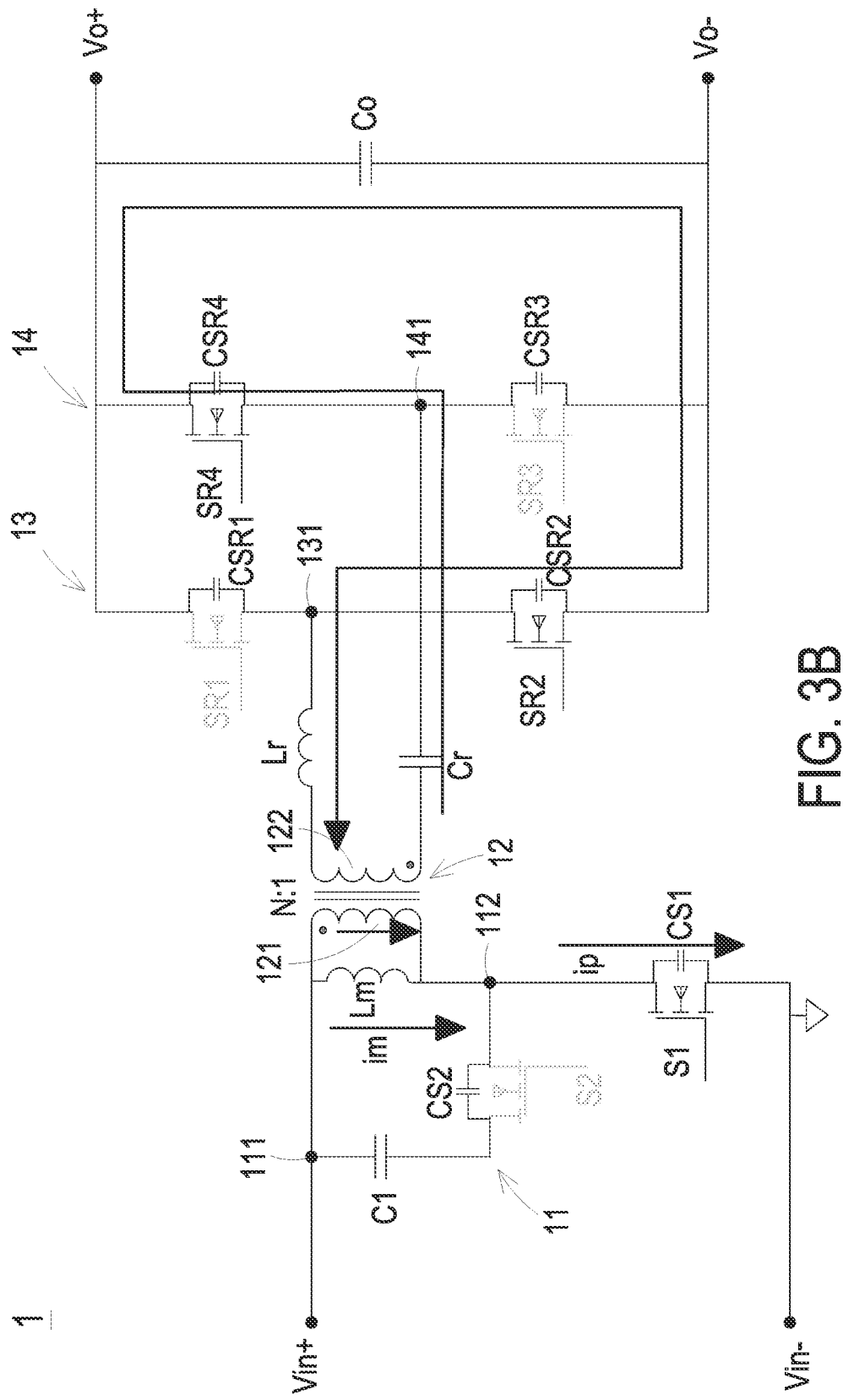

As shown in FIG. 2 and FIG. 3B, at the time t1, the primary current ip becomes positive, and the magnitude of the primary current ip is equal to the magnitude of the equivalent magnetizing current im at the primary side. At this time, the secondary current i_SR1/SR3 equals 0, and the first secondary switch SR1 and the third secondary switch SR3 are turned off with zero-current switching. During the period from time t1 to t2, the resonant inductor Lr and the resonant capacitor Cr keep resonating, and the flow direction of the resonant current changes. In particular, the resonant current flows through the second secondary switch SR2 and the fourth secondary switch SR4 instead of flowing through the first secondary switch SR1 and the third secondary switch SR3. At the time t1, the voltage on the resonant inductor Lr is VLr(t1)=−Vin/N−Vcr(t1)−Vo.

Figure 3C:
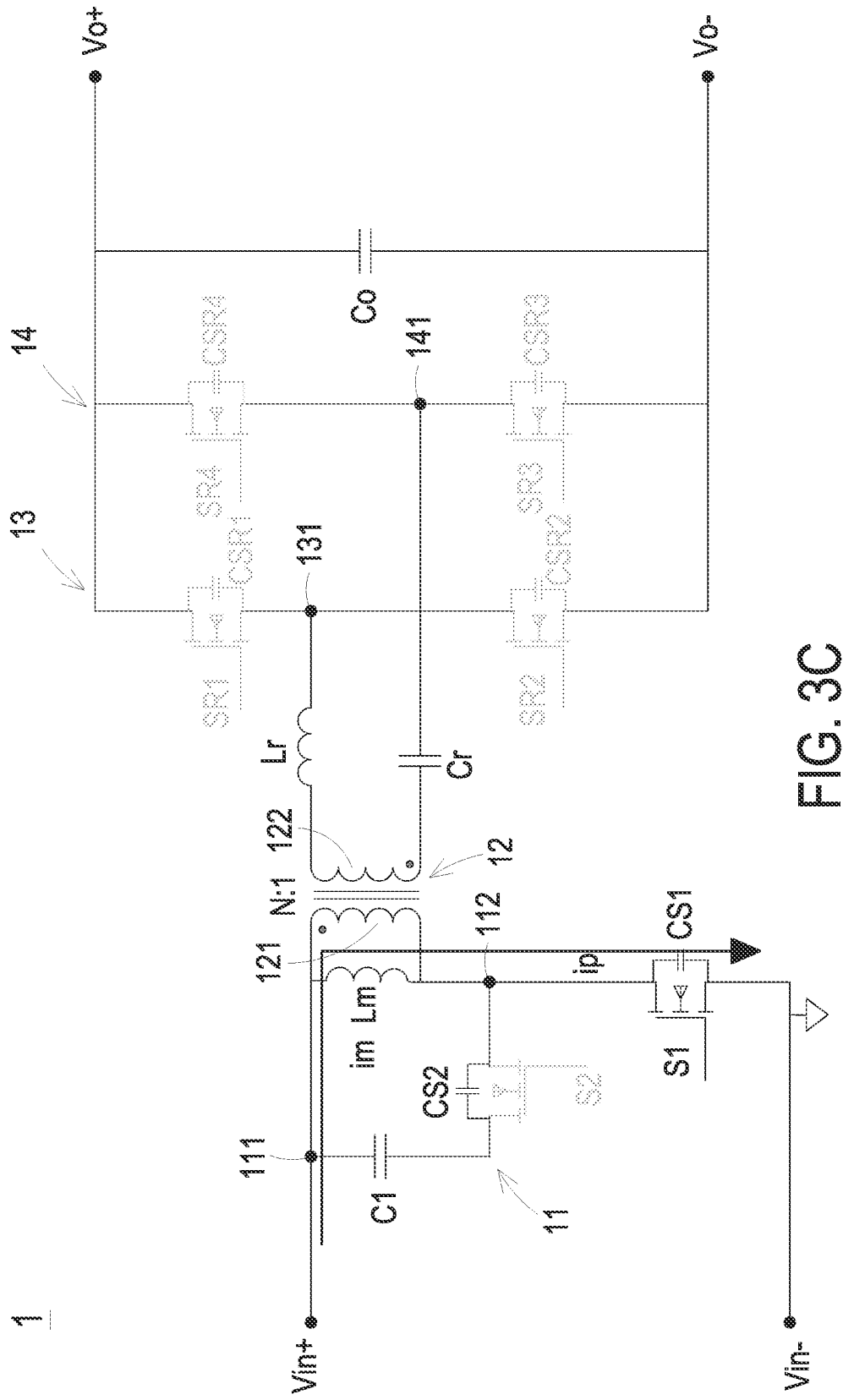

As shown in FIG. 2 and FIG. 3C, at the time t2, a half of the resonance cycle is completed. During the period from time t2 to t3, the primary current ip is equal to the magnetizing current im. Since the body diodes of the second secondary switch SR2 and the fourth secondary switch SR4 are reversely cut off, the resonance is interrupted, and the resonance current equals zero. Accordingly, the primary circuit stops transmitting energy to the secondary circuit. In another embodiment, if the resonant capacitor Cr with a smaller capacitance value is adopted, the resonance can still continue during the period from time t2 to t3.

Before the time t3, the first primary switch S1 is in the "OFF" state, and the magnetizing current im charges the junction capacitance CS1 of the first primary switch S1 and discharges the junction capacitance CS2 of the second primary switch S2.

Figure 3D:
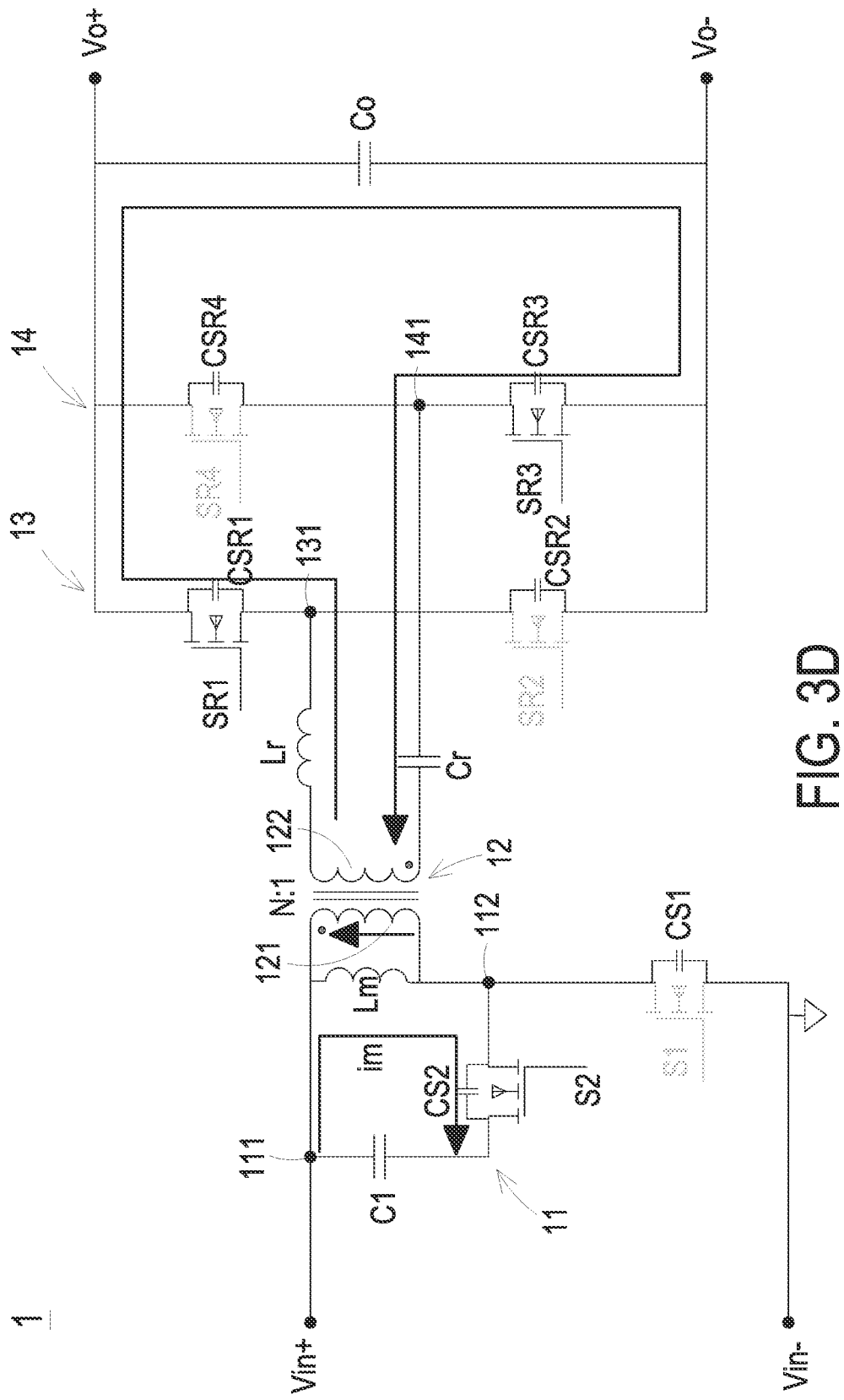

As shown in FIG. 2 and FIG. 3D, at the time t3, the voltage of the junction capacitance CS2 of the second primary switch S2 is discharged to zero, the second primary switch S2 is turned on, and the zero-voltage switching of the second primary switch S2 is realized. The voltage on the primary winding 121 of the transformer 12 becomes negative, the body diode of the first secondary switch SR1 turns on, and the resonant inductor Lr and the resonant capacitor Cr resonate. In addition, at the time t3, the first secondary switch SR1 and the third secondary switch SR3 are turned on. Meanwhile, the voltage on the resonant inductor Lr is VLr(t3)=Vc1(t3)/N−Vcr(t3)−Vo, where Vc1(t3) is the voltage on the clamping capacitor C1 at the time t3.

During the period from time t3 to t4, the resonant inductor Lr and the resonant capacitor Cr keep resonating, and the primary current ip changes from positive to negative. The working state at the time t4 is the same as that at the time t0, thus the detailed descriptions thereof are omitted herein.

From the above descriptions, it can be seen that all the switches in the power conversion circuit of the present disclosure can realize soft switching, thereby reducing the loss. In addition, the resonant elements are provided in the power conversion circuit. Due to the resonance, the switches with lower withstand voltage can be adopted, thus the on-resistance of the switch decreases, and the loss is further reduced. Therefore, under the wide input voltage range, the power conversion circuit of the present disclosure still has high energy efficiency.

Figure 4:
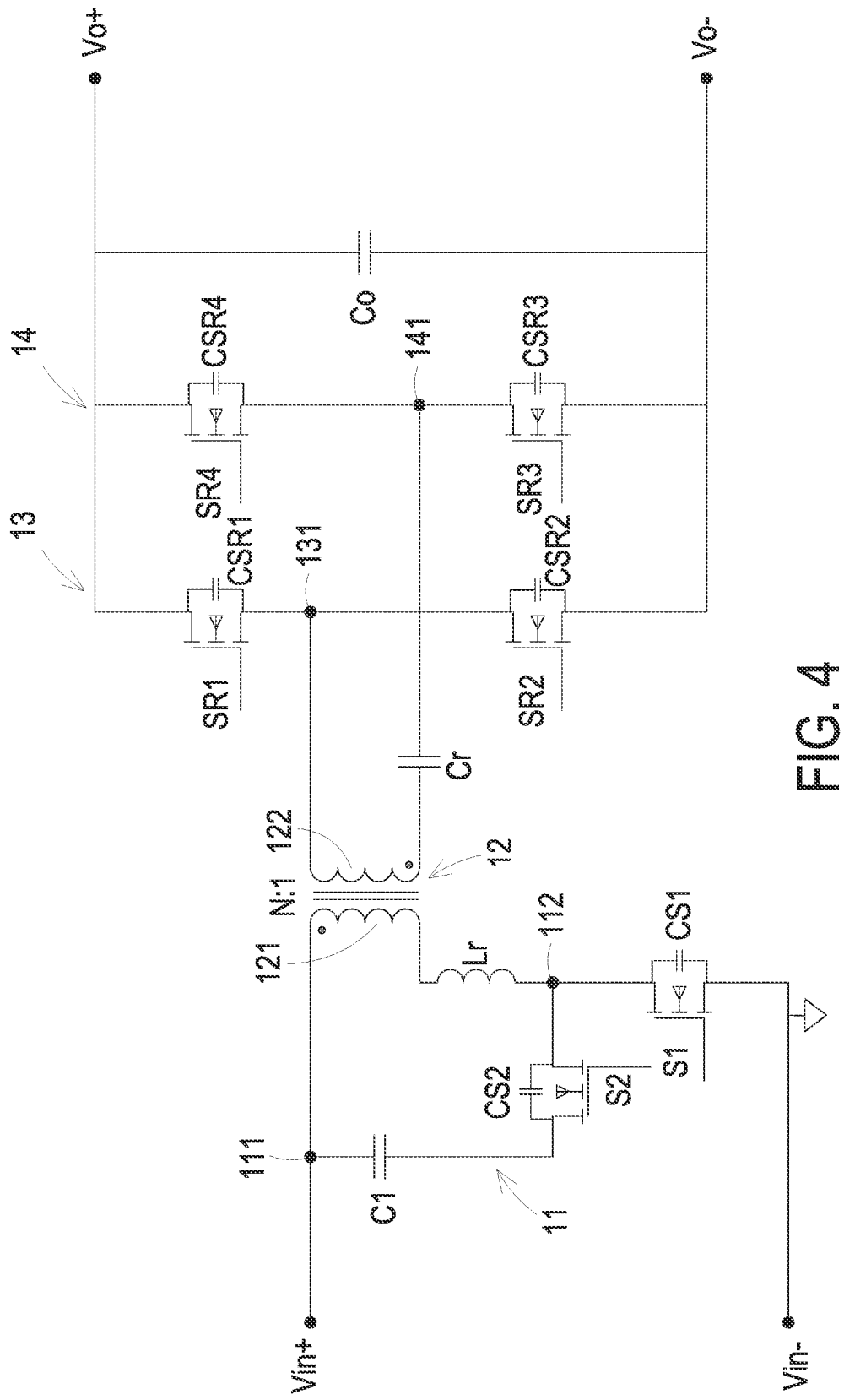
FIG. 4, FIG. 5, FIG. 6, FIG. 7, and FIG. 8 show various embodiments of the power conversion circuit.

In the first embodiment mentioned above, the resonant inductor Lr and the secondary winding 122 are coupled in series between the first connection terminal 131 in the first bridge arm 13 and the second connection terminal 141 in the second bridge arm 14. The resonant inductor Lr may be an additional inductor or a parasitic inductance of the transformer 12, or may be formed by an additional inductor and a parasitic inductance of the transformer 12 collaboratively. However, the implementation of the resonant inductor Lr is not limited thereto. In another embodiment, as shown in FIG. 4, the resonant inductor Lr and the primary winding 121 are coupled in series between the first terminal 111 and the second terminal 112 of the clamping branch circuit 11. The resonant inductor Lr may be an additional inductor or a leakage inductance of the transformer 12, or may be formed by an additional inductor and a leakage inductance of the transformer 12 collaboratively.

Figure 5:
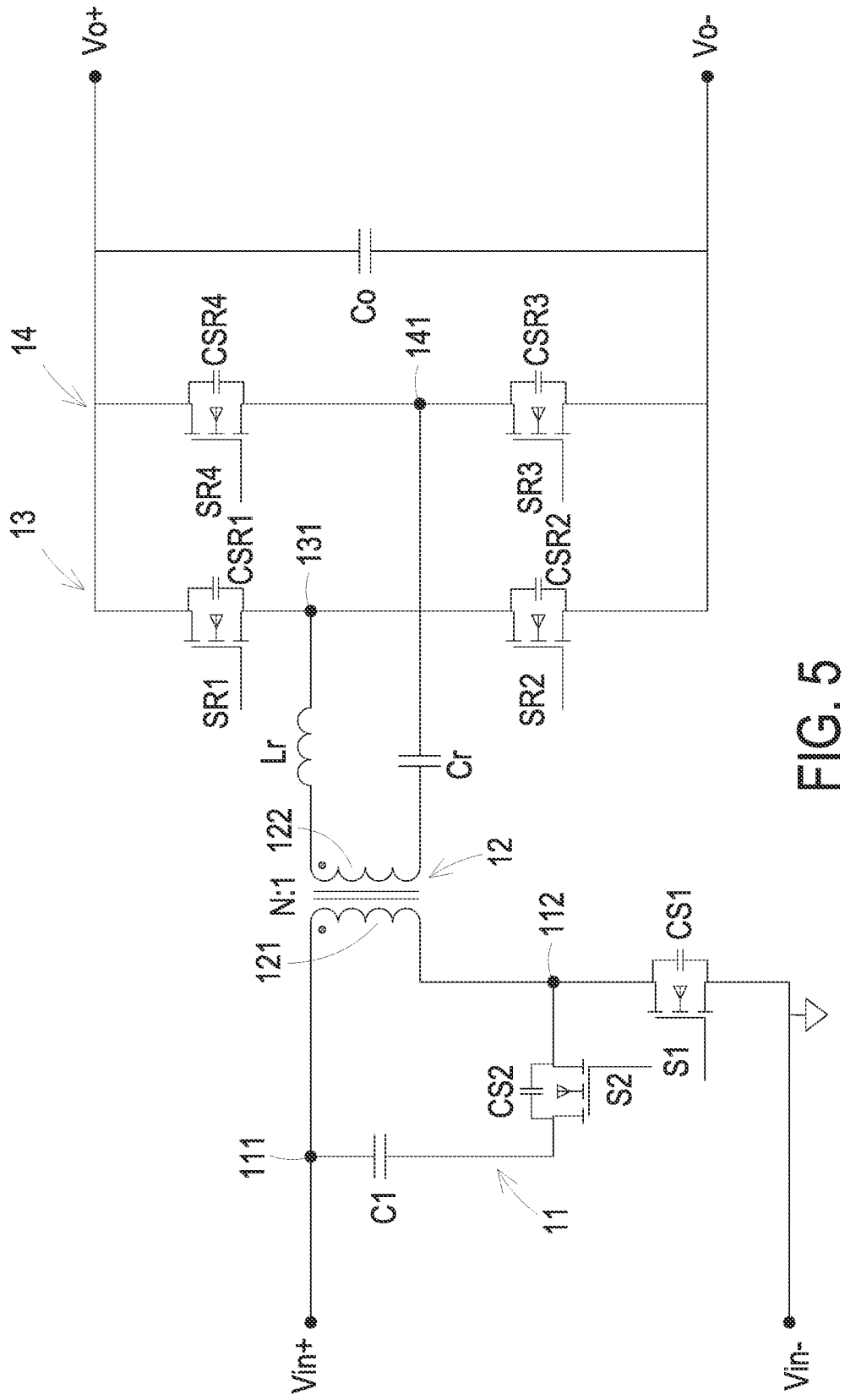
Figure 6:
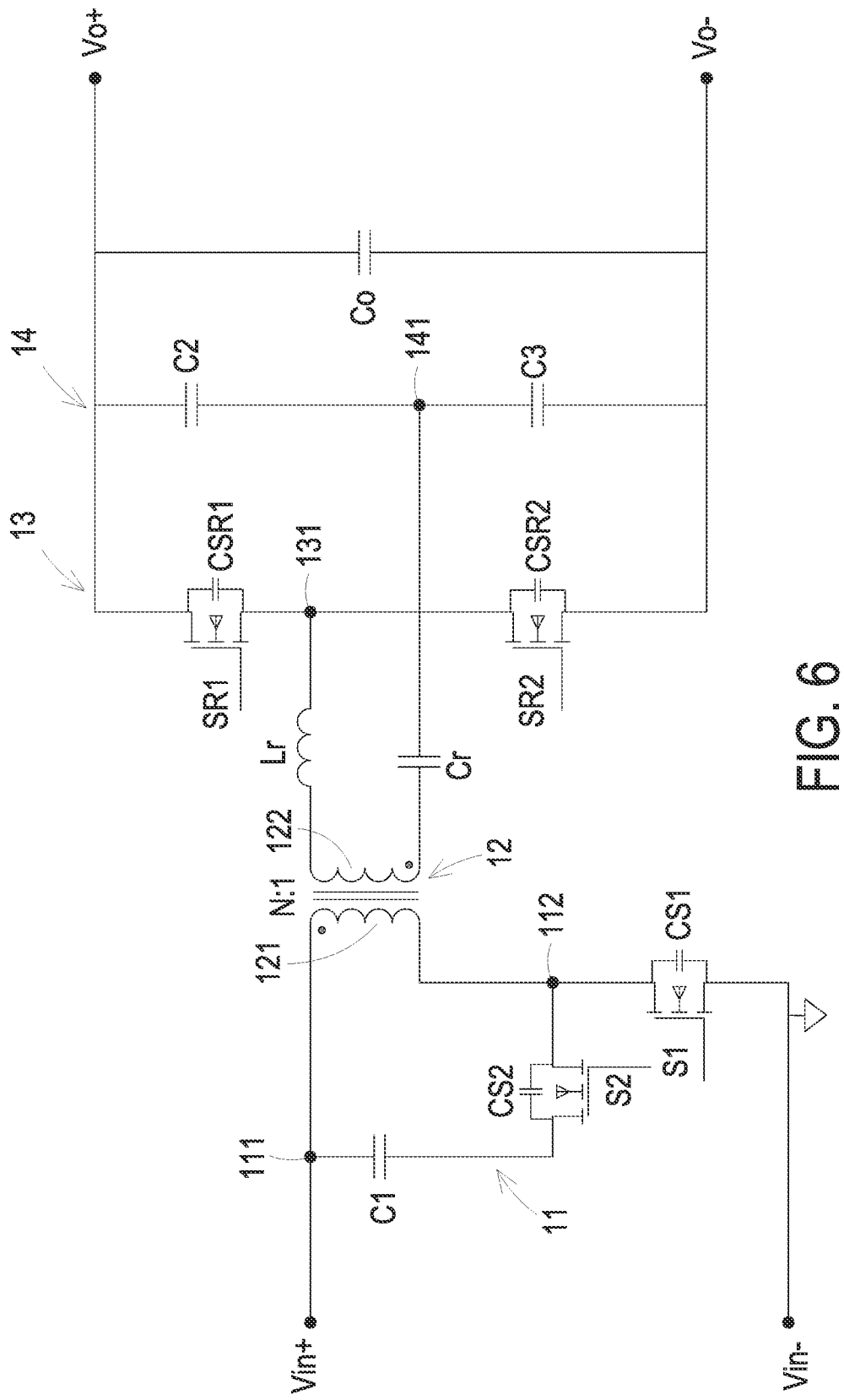
Figure 7:
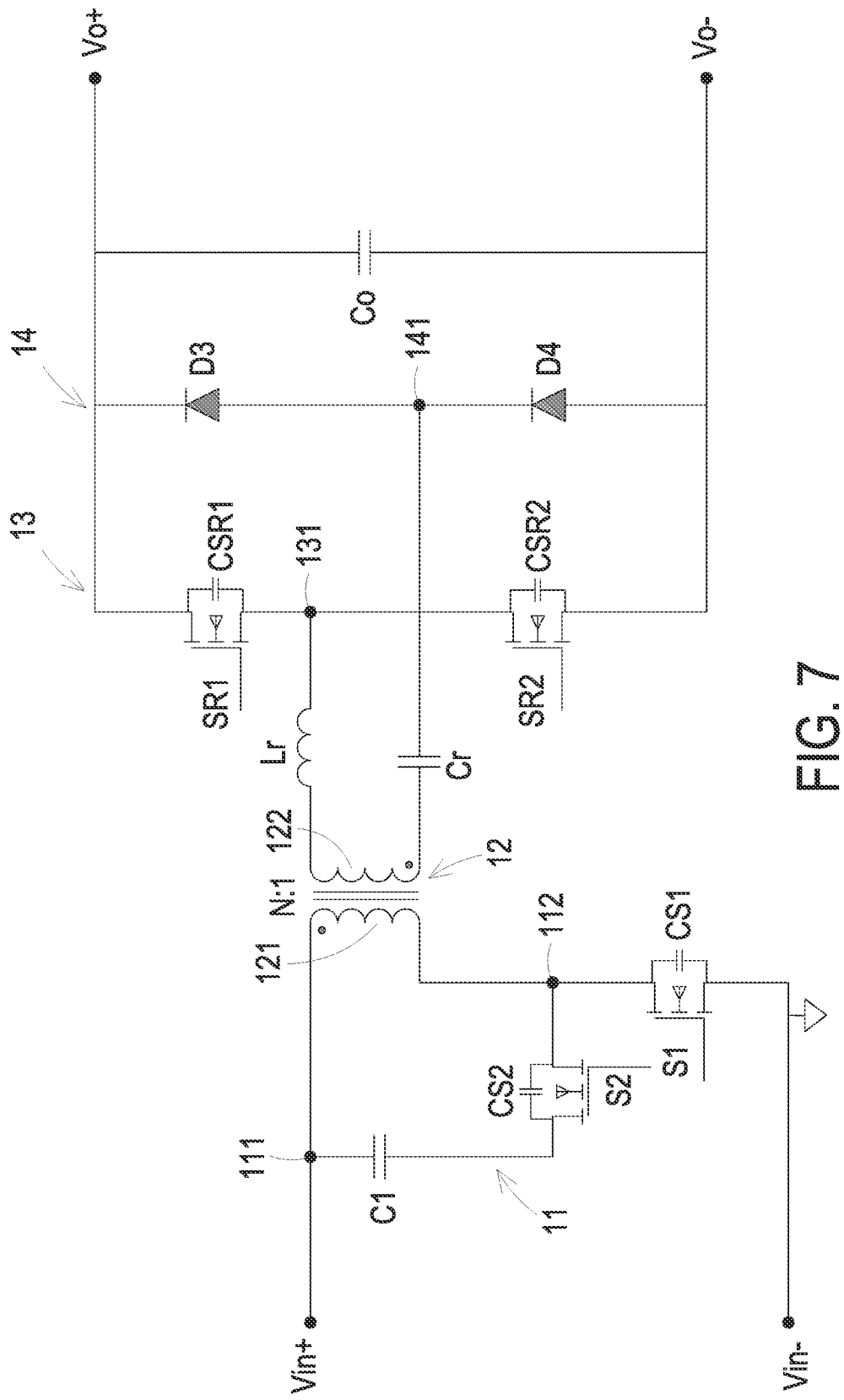

In the first embodiment mentioned above, the terminal of the primary winding 121 electrically connected to the first terminal 111 of the clamping branch circuit 11 and the terminal of the secondary winding 122 electrically connected to the second connection terminal 141 in the second bridge arm 14 are dotted terminals, but not limited thereto. In another embodiment, as shown in FIG. 5, the terminal of the primary winding 121 electrically connected to the first terminal 111 of the clamping branch circuit 11 and the terminal of the secondary winding 122 electrically connected to the first connection terminal 131 in the first bridge arm 13 are dotted terminals In the first embodiment mentioned above, the two electronic elements of the second bridge arm 14 are the third secondary switch SR3 and the fourth secondary switch SR4 respectively, but the implementation of the electronic element is not limited thereto. In another embodiment, as shown in FIG. 6, the two electronic elements of the second bridge arm 14 are two bridge capacitors C2 and C3. In further another embodiment, as shown in FIG. 7, the two electronic elements of the second bridge arm 14 are two diodes, which are a third diode D3 and a fourth diode D4 respectively. The second connection terminal 141 in the second bridge arm 14 is electrically connected to the anode of the third diode D3 and the cathode of the fourth diode D4, the cathode of the third diode D3 is electrically connected to the positive output terminal Vo+, and the anode of the fourth diode D4 is electrically connected to the negative output terminal Vo−.

Figure 8:
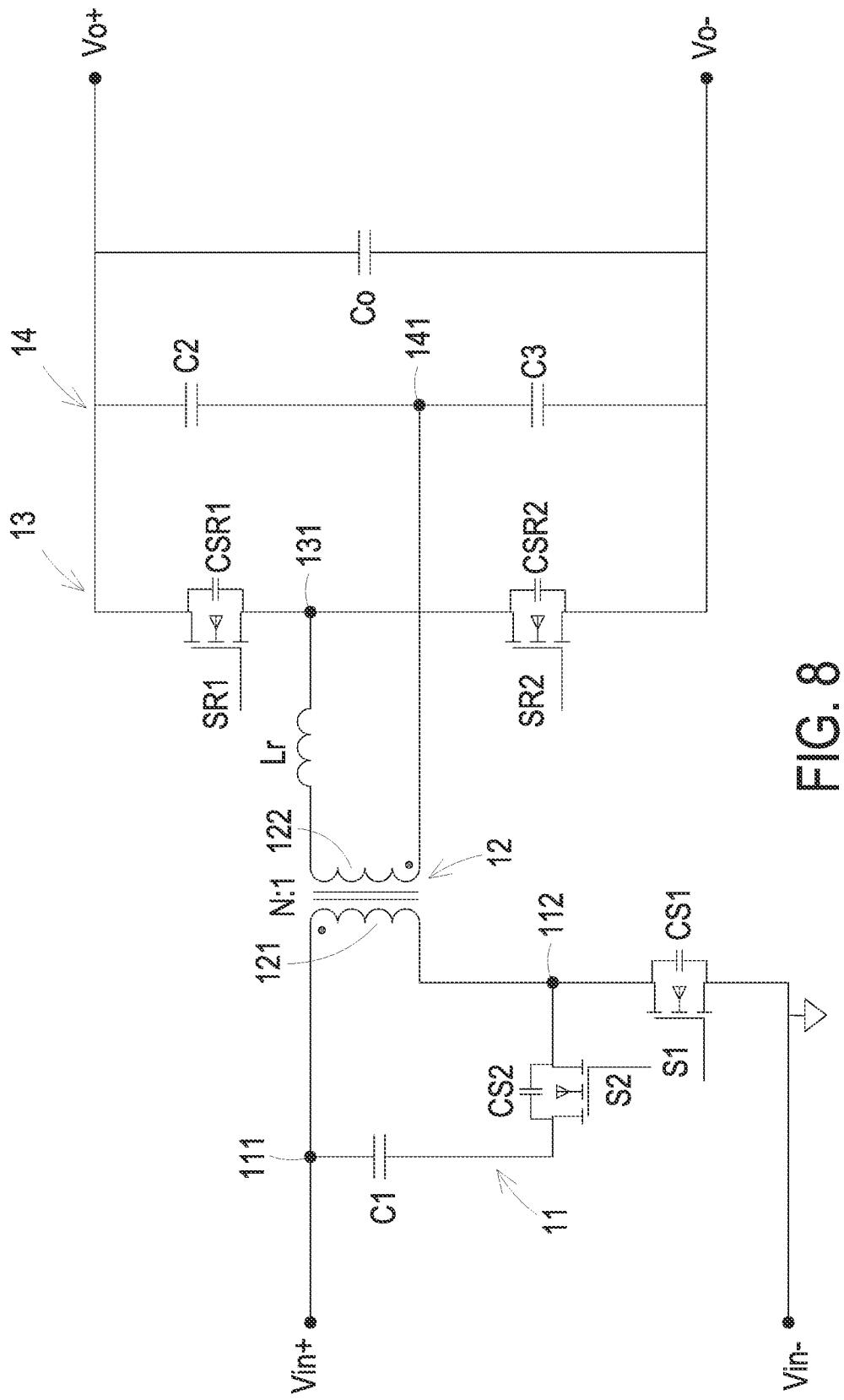

In the first embodiment mentioned above, the resonant capacitor Cr is coupled between the secondary winding 122 and the second connection terminal 141 in the second bridge arm 14, but not limited thereto. In another embodiment, as shown in FIG. 8, under the circumstance that the two electronic elements of the second bridge arm 14 are two bridge capacitors C2 and C3, the two bridge capacitors C2 and C3 may work as resonant capacitors to resonate with the resonant inductor Lr.

In the above variants with different implementations, the work principle of the power conversion circuit is always the same with that in the first embodiment, thus the detailed descriptions thereof are omitted herein.

Figure 9:
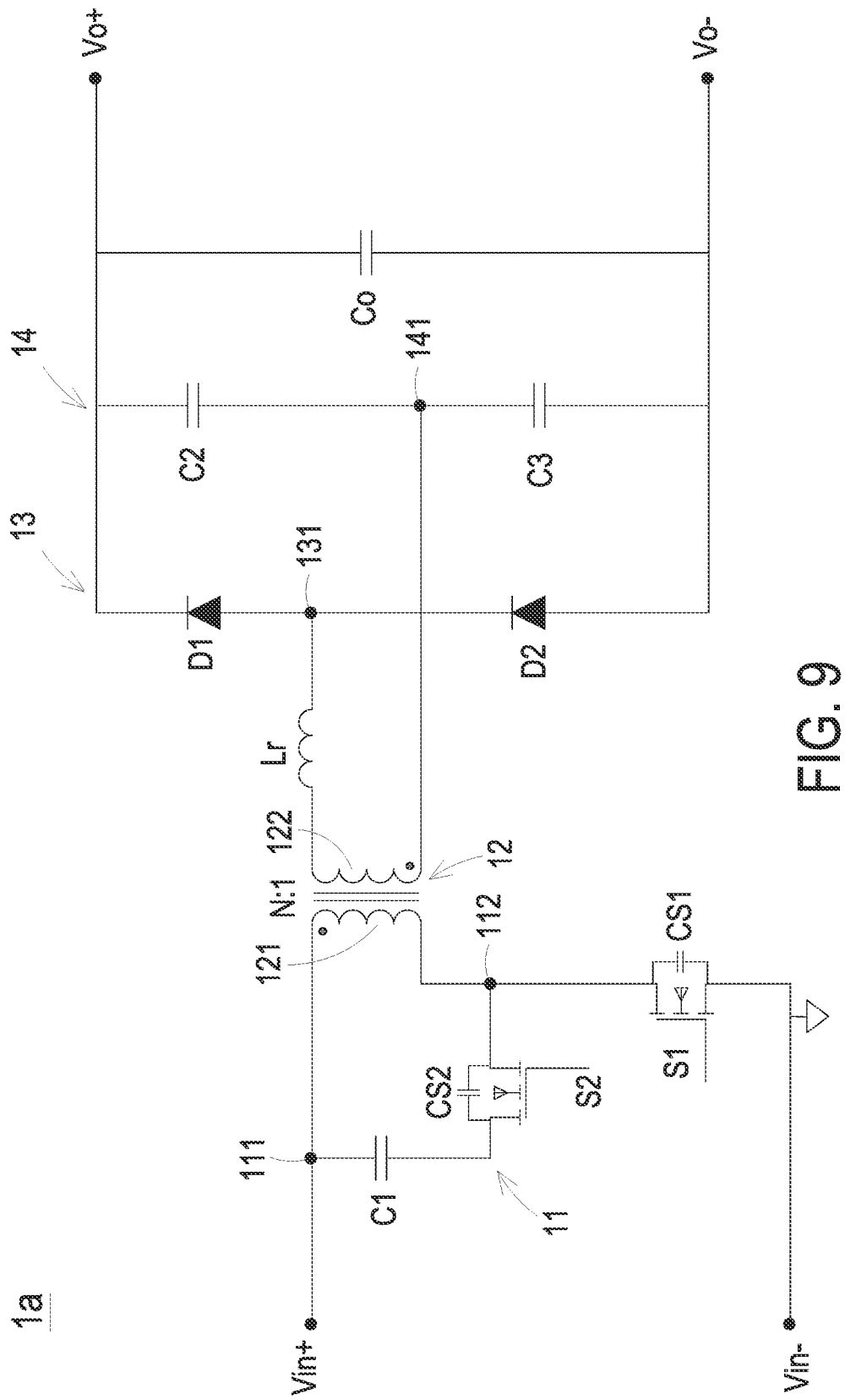
FIG. 9 is a schematic circuit diagram illustrating a power conversion circuit according to a second embodiment of the present disclosure.

In addition, in the above embodiments, the two switch elements of the first bridge arm 13 are the first secondary switch SR1 and the second secondary switch SR2 respectively, but the actual implementation of the switch element is not limited thereto. In the second embodiment of the present disclosure, as shown in FIG. 9, the two switch elements of the first bridge arm 13 are a first diode D1 and a second diode D2. The first connection terminal 131 in the first bridge arm 13 is electrically connected to the anode of the first diode D1 and the cathode of the second diode D2. The cathode of the first diode D1 is electrically connected to the positive output terminal Vo+. The anode of the second diode D2 is electrically connected to the negative output terminal Vo−. Moreover, different from the first embodiment, in the power conversion circuit 1a of the second embodiment, the two electronic elements of the second bridge arm 14 are two bridge capacitors C2 and C3, and the two bridge capacitors C2 and C3 can work as resonant capacitors to resonate with the resonant inductor Lr.

The operation of the power conversion circuit 1a in the second embodiment shown in FIG. 9 would be described in detail as follows according to FIGS. 10A-10D. The control signals PWM1 and PWM2 of the first primary switch S1 and the second primary switch S2 respectively in FIG. 9 are the same with that shown in FIG. 2. FIG. 10A, FIG. 10B, FIG. 10C, and FIG. 10D schematically show the switching state and current direction of the power conversion circuit 1a in the period from time t0 to t1, the period from time t1 to t2, the period from time t2 to t3, and the period from time t3 to t4 respectively.

Figure 10A:
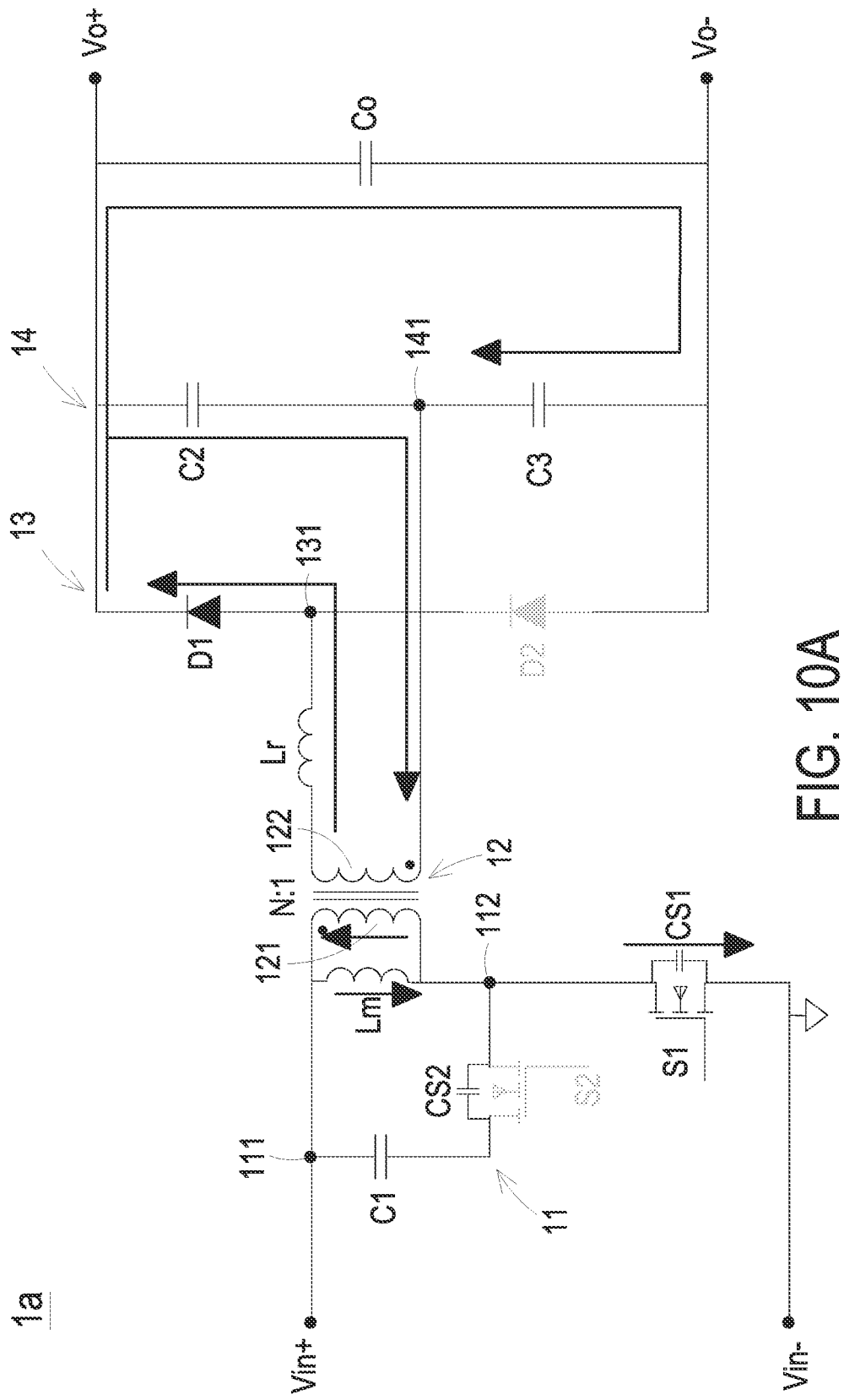
FIG. 10A, FIG. 10B, FIG. 10C, and FIG. 10D schematically show the switching state and current direction of the power conversion circuit of FIG. 9 in different periods.

During the period from time t0 to t1, as shown in FIG. 10A, the first primary switch S1 is in the "ON" state. The primary current ip is negative and its flow direction is from bottom to top. The magnetizing current im is positive and its flow direction is from top to bottom. The resonant inductor Lr resonates with the bridge capacitors C2 and C3 (i.e., the resonant capacitors), and the magnitude of the resonant current is (|ip|+|im|)/N.

Figure 10B:
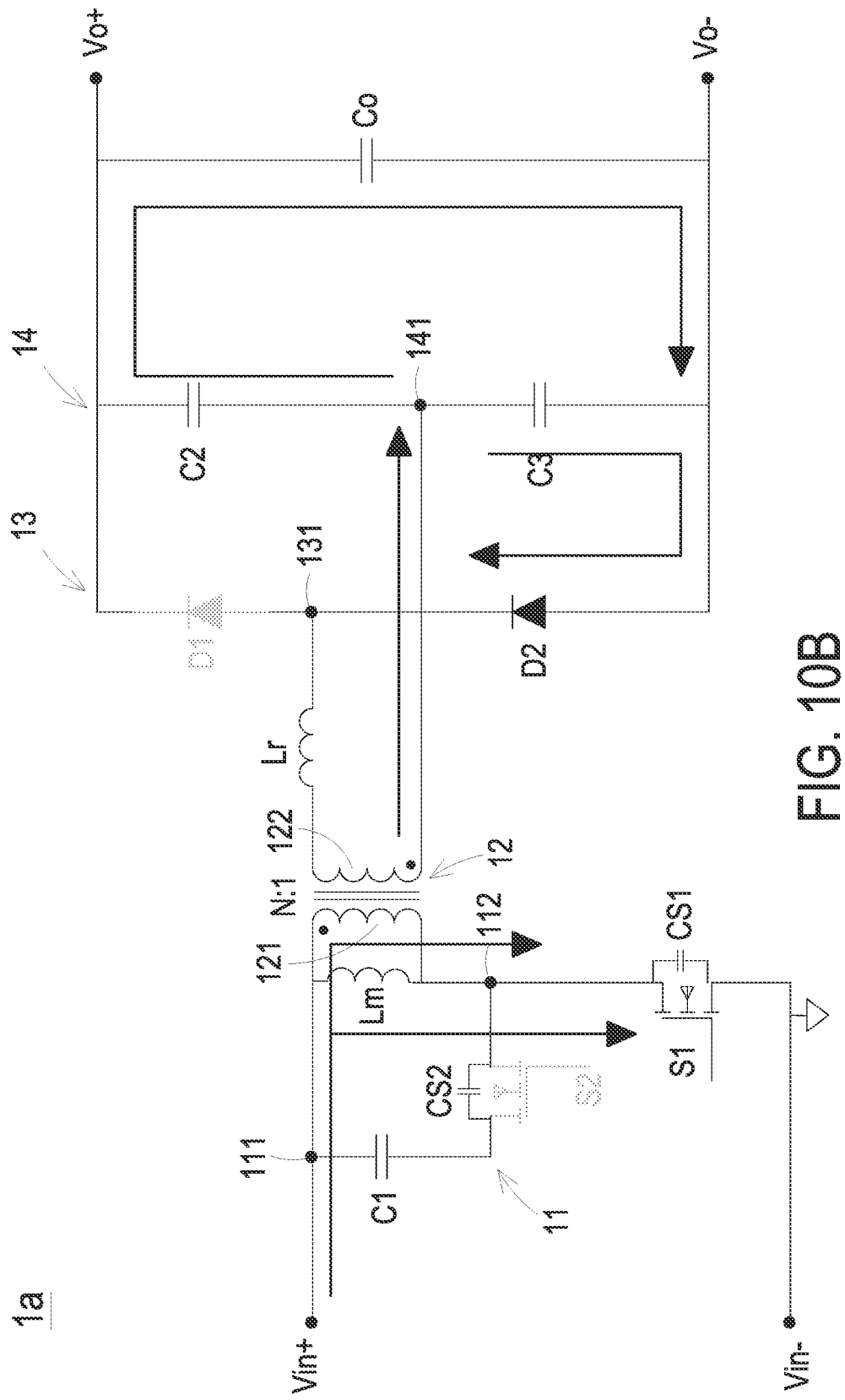

At the time t1, as shown in FIG. 10B, the primary current ip becomes positive and its flow direction is from top to bottom, and the magnitude of the primary current ip is equal to the magnitude of the magnetizing current im. The current flowing through the first diode D1 becomes zero, and the first diode D1 is turned off with zero-current switching.

Afterwards, during the period from time t1 to t2, the magnitude of the primary current ip exceeds the magnitude of the magnetizing current im, and the resonant current flows through the second diode D2 instead of flowing through the first diode D1. The resonant inductor Lr and the bridge capacitors C2 and C3 (i.e., the resonant capacitors) keep resonating to transmit the energy to the output terminal.

Figure 10C:
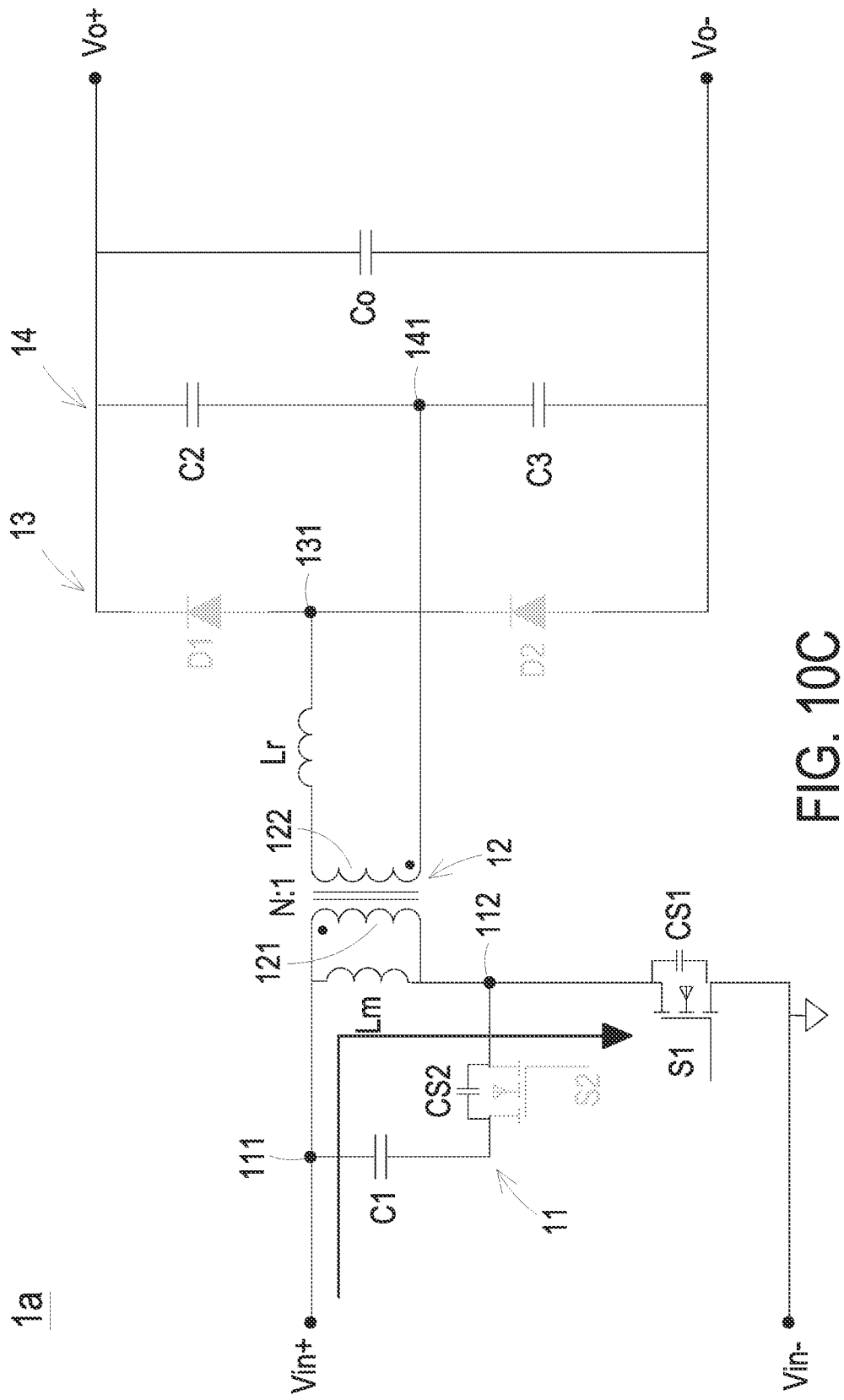

At the time t2, a half of the resonant cycle is passed, the magnitude of the primary current ip is equal to the magnitude of the magnetizing current im again, the current flowing through the second diode D2 becomes zero, and the second diode D2 is turned off with zero-current switching. During the period from time t2 to t3, as shown in FIG. 10C, the resonance stops, the primary circuit stops transmitting energy to the secondary circuit, and the primary current ip and the magnetizing current im are equal in magnitude.

Figure 10D:
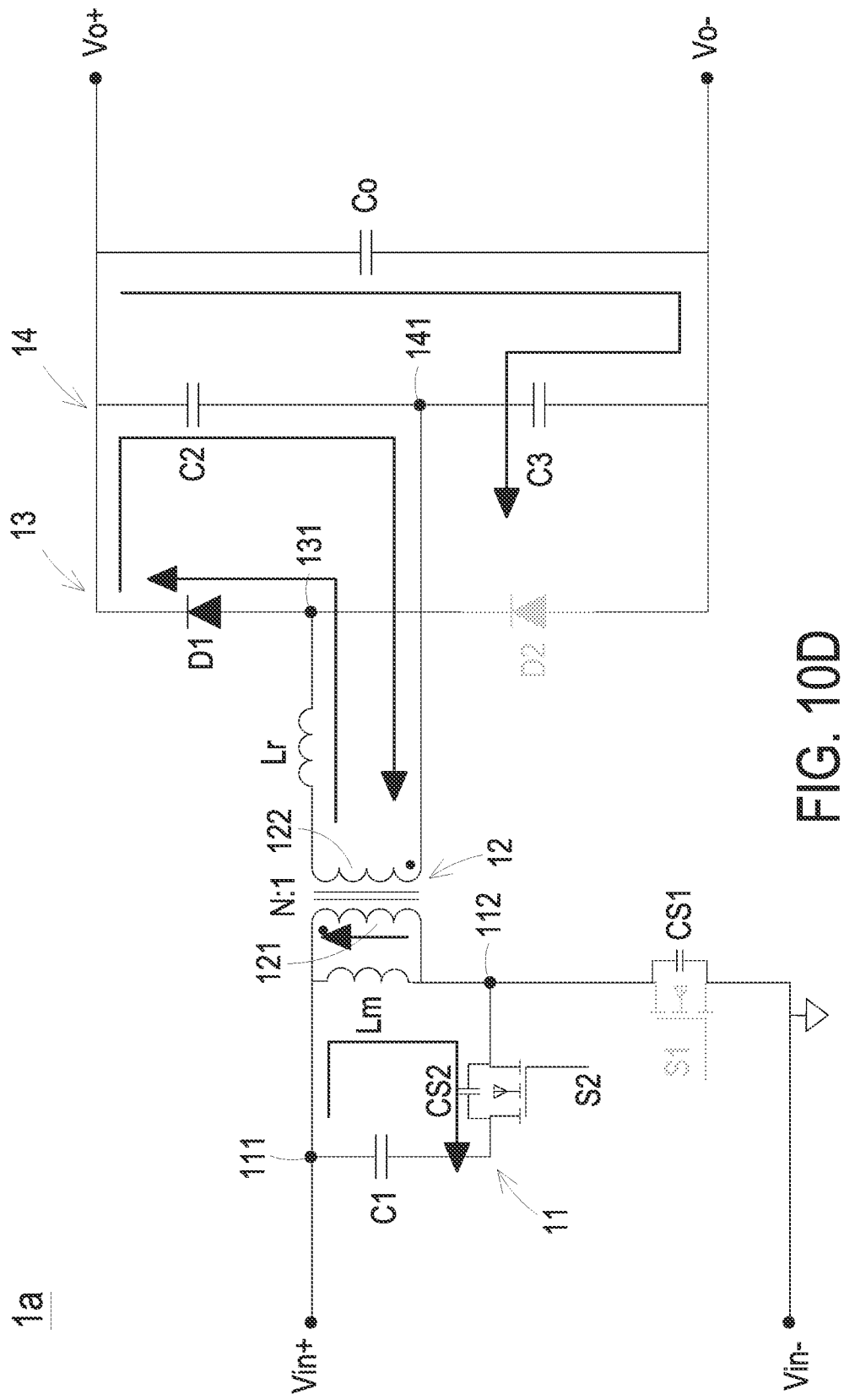

Before the time t3, the first primary switch S1 is in the "OFF" state, and the magnetizing current im is generated by charging the junction capacitance CS1 of the first primary switch S1 and discharging the junction capacitance CS2 of the second primary switch S2. At the time t3, as shown in FIG. 10D, the voltage of the junction capacitance CS2 of the second primary switch S2 is discharged to zero, the second primary switch S2 is turned on, and the zero-voltage switching of the second primary switch S2 is realized. The magnetizing current im continues to charge the clamping capacitor C1. The polarity of the voltage on the primary winding 121 of the transformer 12 changes from being positive on the top and negative on the bottom to being positive on the bottom and negative on the top. The first diode D1 is turned on, the resonant inductor Lr and the capacitors C2 and C3 resonate, and the energy is transmitted to the output terminal.

In summary, the present disclosure provides a power conversion circuit. All the switches of the power conversion circuit can realize the soft switching, thereby reducing the loss. In addition, the resonant elements are provided in the power conversion circuit. Due to the resonance, the switches with lower withstand voltage can be adopted, thus the on-resistance of the switch decreases, and the loss is further reduced. Therefore, under the wide input voltage range, the power conversion circuit of the present disclosure still has high energy efficiency.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power conversion circuit, comprising:
a positive input terminal and a negative input terminal configured to receive an input voltage;
a clamping branch circuit and a first primary switch electrically connected in series, wherein the clamping branch circuit has a first terminal and a second terminal and comprises a clamping capacitor and a second primary switch electrically connected in series between the first terminal and the second terminal, the first terminal is coupled to the positive input terminal, and the first primary switch is electrically connected between the second terminal and the negative input terminal;

a transformer comprising a primary winding and a secondary winding coupled to each other, wherein the primary winding and the clamping branch circuit are electrically connected in parallel;

a rectifier circuit comprising a first bridge arm and a second bridge arm electrically connected to each other in parallel, wherein the first bridge arm comprises two switch elements electrically connected in series, the second bridge arm comprises two electronic elements electrically connected in series, a first connection terminal between the two switch elements and a second connection terminal between the two electronic elements are coupled to two terminals of the secondary winding correspondingly;

a resonant inductor and a resonant capacitor configured to resonate in the power conversion circuit; and a positive output terminal and a negative output terminal configured to provide an output voltage, wherein the first and second bridge arms electrically connected in parallel are coupled between the positive output terminal and the negative output terminal.

2. The power conversion circuit according to claim 1, wherein a control signal of the first primary switch and a control signal of the second primary switch are complementary, and a duty ratio of the first primary switch depends on a magnitude of the output voltage.

3. The power conversion circuit according to claim 1, wherein the two switch elements are a first secondary switch and a second secondary switch respectively, the first secondary switch is electrically connected between the first connection terminal in the first bridge arm and the positive output terminal, and the second secondary switch is electrically connected between the first connection terminal in the first bridge arm and the negative output terminal, wherein when secondary currents following through the first secondary switch and the second secondary switch respectively change from a positive value to zero, the first secondary switch and the second secondary switch are turned off correspondingly.

4. The power conversion circuit according to claim 3, wherein when the secondary currents following through the first secondary switch and the second secondary switch respectively change from zero to a positive value, the first secondary switch and the second secondary switch are turned on correspondingly.

5. The power conversion circuit according to claim 4, wherein the two electronic elements are a third secondary switch and a fourth secondary switch respectively, the third secondary switch is electrically connected between the second connection terminal in the second bridge arm and the negative output terminal, the fourth secondary switch is electrically connected between the second connection terminal in the second bridge arm and the positive output terminal, the first secondary switch and the third secondary switch are turned on and off synchronously, the second secondary switch and the fourth secondary switch are turned on and off synchronously, and each of the secondary switches is turned off when a secondary current flowing therethrough changes from a positive value to zero.

6. The power conversion circuit according to claim 1, wherein the two switch elements are a first diode and a second diode respectively, the first connection terminal in the first bridge arm is electrically connected to an anode of the first diode and a cathode of the second diode, a cathode of the first diode is electrically connected to the positive output terminal, and an anode of the second diode is electrically connected to the negative output terminal.

7. The power conversion circuit according to claim 1, wherein the two electronic elements are a third diode and a fourth diode respectively, the second connection terminal in the second bridge arm is electrically connected to an anode of the third diode and a cathode of the fourth diode, a cathode of the third diode is electrically connected to the positive output terminal, and an anode of the fourth diode is electrically connected to the negative output terminal.

8. The power conversion circuit according to claim 1, wherein the two electronic elements are two bridge capacitors.

9. The power conversion circuit according to claim 8, wherein the resonant capacitor comprises the two bridge capacitors.

10. The power conversion circuit according to claim 1, wherein the resonant capacitor, the resonant inductor, and the secondary winding are coupled in series between the first connection terminal in the first bridge arm and the second connection terminal in the second bridge arm.

11. The power conversion circuit according to claim 1, wherein the resonant inductor and the primary winding are coupled in series between the first terminal and the second terminal of the clamping branch circuit.

12. The power conversion circuit according to claim 1, wherein the resonant inductor comprises an additional inductor and/or a parasitic inductance or a leakage inductance of the transformer.

13. The power conversion circuit according to claim 1, wherein one terminal of the primary winding electrically connected to the first terminal of the clamping branch circuit and one terminal of the secondary winding electrically connected to the first connection terminal in the first bridge arm are dotted terminals.

14. The power conversion circuit according to claim 1, wherein one terminal of the primary winding electrically connected to the first terminal of the clamping branch circuit and one terminal of the secondary winding electrically connected to the second connection terminal in the second bridge arm are dotted terminals.

15. The power conversion circuit according to claim 1, further comprising an output capacitor electrically connected to the rectifier circuit in parallel.

\* \* \* \* \*